United States Patent
Grover et al.

(10) Patent No.: US 12,056,239 B2
(45) Date of Patent: Aug. 6, 2024

(54) THREAD-BASED MALWARE DETECTION

(71) Applicant: MICRO FOCUS LLC, Santa Clara, CA (US)

(72) Inventors: Douglas M. Grover, Provo, UT (US); Duane F. Buss, Provo, UT (US); Michael F. Angelo, Houston, TX (US)

(73) Assignee: Micro Focus LLC, Santa Clara, CA (US)

( * ) Notice: Subject to any disclaimer, the term of this patent is extended or adjusted under 35 U.S.C. 154(b) by 232 days.

(21) Appl. No.: 16/995,974

(22) Filed: Aug. 18, 2020

(65) Prior Publication Data
US 2022/0058264 A1    Feb. 24, 2022

(51) Int. Cl.
*G06F 21/55* (2013.01)
*G06F 21/56* (2013.01)
*G06N 20/00* (2019.01)
*G06F 21/52* (2013.01)

(52) U.S. Cl.
CPC .......... *G06F 21/566* (2013.01); *G06F 21/554* (2013.01); *G06N 20/00* (2019.01); *G06F 21/52* (2013.01); *G06F 21/552* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 7,840,501 B1 * | 11/2010 | Sallam | H04L 63/1408 706/10 |
| 7,854,004 B2 | 12/2010 | Van der Made | |
| 8,935,788 B1 | 1/2015 | Diao et al. | |
| 9,246,937 B2 | 1/2016 | Ko | |
| 9,372,989 B2 * | 6/2016 | Grystan | G06F 21/566 |
| 9,654,485 B1 * | 5/2017 | Neumann | H04L 63/1416 |
| 9,734,337 B1 * | 8/2017 | Patton | G06F 21/568 |
| 10,089,582 B2 * | 10/2018 | Fawaz | G06N 20/00 |

(Continued)

FOREIGN PATENT DOCUMENTS

| | | |
|---|---|---|
| JP | 2010134536 A | 6/2010 |
| KR | 101277617 B1 | 7/2013 |

(Continued)

*Primary Examiner* — Michael W Chao
(74) *Attorney, Agent, or Firm* — Sheridan Ross P.C.

(57) ABSTRACT

Embodiments provide for detecting viruses and other malware in executing process threads based on thread patterns. According to one embodiment, detecting previously unknown malware associated with process threads can comprise capturing context information for each thread of a plurality of threads executing on a processor. The context information can define a thread pattern for the thread. The thread pattern for each thread can be compared to stored information defining one or more known patterns for thread execution based on previous execution of one or more threads. A thread pattern variation can be detected when the thread pattern for one or more threads does not match the stored information defining the known thread patterns. A determination can be made as to whether the detected thread pattern variation indicates presence of malware and actions can be performed based on determining the detected thread pattern variation indicates the presence of malware.

20 Claims, 5 Drawing Sheets

(56) References Cited

U.S. PATENT DOCUMENTS

| | | | |
|---|---|---|---|
| 10,339,304 B2* | 7/2019 | Gu | H04L 63/1491 |
| 10,430,591 B1* | 10/2019 | Pratt | H04L 63/1416 |
| 10,671,726 B1* | 6/2020 | Paithane | H04L 63/1416 |
| 10,706,148 B2* | 7/2020 | Dymshits | G06F 21/56 |
| 10,963,566 B2* | 3/2021 | Agrawal | G06F 21/56 |
| 10,972,484 B1* | 4/2021 | Swackhamer | H04L 63/1416 |
| 11,256,802 B1* | 2/2022 | Forcada | G06F 21/56 |
| 11,436,535 B2* | 9/2022 | G Rao | G06N 20/00 |
| 11,544,379 B2* | 1/2023 | Sandoval | G06F 21/566 |
| 11,550,900 B1* | 1/2023 | Engels | G06F 21/71 |
| 11,709,939 B2* | 7/2023 | Khorrami | G06F 11/3612 726/22 |
| 11,720,844 B2* | 8/2023 | Ladnai | G06N 5/04 726/23 |
| 11,818,145 B2* | 11/2023 | Pan | G06N 3/042 |
| 11,907,370 B2* | 2/2024 | Diehl | G06F 21/566 |
| 2007/0079375 A1* | 4/2007 | Copley | G06F 21/566 726/22 |
| 2007/0240222 A1* | 10/2007 | Tuvell | H04W 12/128 726/24 |
| 2010/0107143 A1* | 4/2010 | Emberling | G06F 11/302 717/128 |
| 2011/0185230 A1* | 7/2011 | Agrawal | G06F 11/0751 714/E11.029 |
| 2012/0255004 A1* | 10/2012 | Sallam | G06F 21/554 726/23 |
| 2012/0255014 A1* | 10/2012 | Sallam | G06F 21/554 726/24 |
| 2014/0096184 A1* | 4/2014 | Zaitsev | G06F 21/50 726/1 |
| 2014/0123280 A1* | 5/2014 | Kedma | G06F 21/566 726/23 |
| 2014/0317734 A1* | 10/2014 | Valencia | G06F 21/552 726/22 |
| 2014/0337862 A1* | 11/2014 | Valencia | G06F 21/45 719/313 |
| 2015/0033078 A1* | 1/2015 | Wintergerst | G06F 11/3664 714/38.1 |
| 2015/0082430 A1* | 3/2015 | Sridhara | G06F 21/552 726/23 |
| 2015/0180883 A1* | 6/2015 | Aktas | G06F 9/46 726/23 |
| 2016/0021174 A1* | 1/2016 | De Los Santos Vilchez | H04W 12/128 709/201 |
| 2016/0029221 A1* | 1/2016 | Suarez Garcia | H04W 12/128 455/410 |
| 2016/0036722 A1* | 2/2016 | Obrecht | G06F 11/3409 709/226 |
| 2016/0057159 A1* | 2/2016 | Yin | H04L 63/145 726/23 |
| 2016/0065613 A1 | 3/2016 | Cho et al. | |
| 2016/0078347 A1* | 3/2016 | Salajegheh | G06N 5/04 706/12 |
| 2016/0110543 A1* | 4/2016 | Park | G06F 21/57 726/22 |
| 2016/0173509 A1* | 6/2016 | Ray | H04L 63/1425 726/23 |
| 2016/0173525 A1* | 6/2016 | Thomas | H04L 63/145 726/23 |
| 2016/0212099 A1* | 7/2016 | Zou | H04L 63/1408 |
| 2016/0217029 A1* | 7/2016 | Yoon | G06F 11/3604 |
| 2017/0032120 A1* | 2/2017 | Tolpin | G06F 21/53 |
| 2017/0046510 A1* | 2/2017 | Chen | G06F 21/552 |
| 2018/0039779 A1* | 2/2018 | Li | G06F 21/566 |
| 2018/0189484 A1* | 7/2018 | Danahy | G06N 20/00 |
| 2019/0012486 A1* | 1/2019 | Landau | G06F 9/3846 |
| 2019/0081963 A1* | 3/2019 | Waghorn | G06F 21/552 |
| 2019/0102543 A1* | 4/2019 | Lew | G06F 9/545 |
| 2019/0207969 A1* | 7/2019 | Brown | G06F 21/552 |
| 2019/0213323 A1* | 7/2019 | Tumblin | G06F 21/554 |
| 2019/0230107 A1 | 7/2019 | De Sapio et al. | |
| 2019/0286821 A1* | 9/2019 | Strogov | G06F 21/568 |
| 2019/0319977 A1* | 10/2019 | Gottschlich | G06K 9/6256 |
| 2020/0210580 A1* | 7/2020 | Strogov | G06N 20/20 |
| 2020/0311268 A1* | 10/2020 | Kostyushko | G06F 21/561 |
| 2020/0412725 A1* | 12/2020 | Devane | H04L 63/1433 |
| 2021/0173930 A1* | 6/2021 | Dahal | H04L 63/145 |
| 2021/0200870 A1* | 7/2021 | Yavo | H04L 63/1416 |
| 2021/0273958 A1* | 9/2021 | McLean | H04L 63/1433 |
| 2022/0258955 A1* | 8/2022 | Tumblin | G06F 12/1009 |
| 2022/0342983 A1* | 10/2022 | Lin | G06F 9/4484 |

FOREIGN PATENT DOCUMENTS

| | | |
|---|---|---|
| KR | 101444141 B1 | 9/2014 |
| WO | WO-2019103368 A1 | 5/2019 |

* cited by examiner

THREAD-BASED MALWARE DETECTION

FIELD OF THE DISCLOSURE

Embodiments of the present disclosure relate generally to methods and systems for detecting viruses and other malware and more particularly to detecting viruses and other malware in executing threads based on thread patterns.

BACKGROUND

It is often difficult to identify new viruses and other malware on computer systems and networks. Existing systems that detect viruses and/or malware tend to use virus patterns. These virus patterns can represent known characteristics or behaviors when the malware is executed. When one or these known patterns is found, the executing process thread generating the known pattern can be identified as possible malware. This approach is useful once the virus pattern has been determined. However, if the virus or malware, the virus pattern is likely not known and the new malware can go undetected.

Additionally, the process of detecting thread patterns typically requires the processing of enormous amounts of data, e.g., terra bytes, from multiple systems, or even a single system, and cannot be practically done by a human. An example would be an Apache server that can spin off hundreds or thousands threads in a short period of time. It would be impossible for a human to manually, or even with assistance, to capture and track all of the data for all of these threads in real-time let alone to detect any malware. Hence, there is a need for improved methods and systems for automatically detecting viruses and other malware including new or previously unknown viruses and malware.

BRIEF SUMMARY

Embodiments of the disclosure provide systems and methods for detecting viruses and other malware in executing process threads based on thread patterns. According to one embodiment, a method for detecting malware associated with process threads can comprise capturing context information for each thread of a plurality of threads executing on a processor. The context information can define a thread pattern for the thread. For example, the context information can comprise one or more of thread execution time, time between successive executions of two or more threads, time between successive executions of the same thread, file access by the thread, Input/Output (I/O) access by the thread, keyboard tracking by the thread, network traffic related to the thread, ports used by the thread, destination addresses used by the thread, system Application Program Interface (API) usage by the thread, copy of data to other devices performed by the thread, stack variables of the thread, stack information of the thread upon instantiation of the thread, stack information of the thread upon exit of the thread, heap information, and/or others.

The thread pattern for each thread executing on the processor can be compared to stored information defining one or more known patterns for thread execution based on previous execution of one or more threads. A thread pattern variation can be detected based on the comparing of the thread pattern for each thread of the plurality of threads to the stored information defining the one or more known thread patterns. The thread pattern variation can be detected when the thread pattern for one or more threads of the plurality of threads does not match the stored information defining the one or more known thread patterns.

In some cases, comparing the thread pattern for a thread executing on the processor to stored information defining one or more known patterns for thread execution can comprise comparing a thread pattern from a current execution of the thread to a previous execution of the same thread. In such cases, the thread pattern variation can comprise one or more of a change in a size of a stack for the thread, a change in data in the stack for the thread, a change in a size of a heap for the thread, a change in data in the heap for the thread, a change in a size of code for the thread, and/or others. Additionally, or alternatively, the thread pattern variation can comprise one or more of a new thread pattern, a new type of API call, a type of API call associated with malware, a new sequence of API calls, a change in an order of two or more threads, a missing thread, two or more threads previously executing in series now executing in parallel, two or more threads previously executing in parallel now executing in series, a change in an amount of time for a thread to execute, a change in an amount of time between executions of a thread, a change in thread priority for a thread, a thread that does not occur within a defined time period, a missing thread that is spun from an existing thread, a new thread that is spun from an existing thread, a missing thread that was previously identified as needed, a thread that does not occur at a predefined period, a thread that does not occur in response to an event associated with the thread, a number of thread occurrences that exceeds a predefined threshold, and/or others.

A determination can be made as to whether the detected thread pattern variation indicates presence of malware. For example, determining whether the detected thread pattern variation indicates presence of malware can comprise comparing system API usage for a thread having a detected thread pattern variation to previous system API usage for the thread. Additionally, or alternatively, determining whether the detected thread pattern variation indicates presence of malware can comprise comparing file access for a thread having a detected thread pattern variation to previous to previous file access for the thread. In another example, determining whether the detected thread pattern variation indicates presence of malware can comprise comparing I/O access for a thread having a detected thread pattern variation to previous I/O access for the thread. In some cases, determining whether the detected thread pattern variation indicates presence of malware can additionally or alternatively comprise comparing network traffic for a thread having a detected thread pattern variation to previous network traffic for the thread. In other cases, determining whether the detected thread pattern variation indicates presence of malware can additionally, or alternatively, comprise comparing network addresses used by a thread having a detected thread pattern variation to previous network addresses used by the thread. Additionally, or alternatively, determining whether the detected thread pattern variation indicates presence of malware can comprise comparing API usage for a thread having a detected thread pattern variation to previous API usage for the thread. Determining whether the detected thread pattern variation indicates presence of malware can additionally, or alternatively comprise comparing the context information for threads previously running in series but which are now running in parallel. In yet another example, determining whether the detected thread pattern variation indicates presence of malware can additionally, or alternatively, comprise comparing a file history for a thread having a detected thread pattern variation to a previous file history for the thread. Additionally, or alternatively, determining whether the detected thread pattern variation indicates presence of malware can comprise dynamically comparing thread to thread context information for each of the plurality of threads. In yet another example, determining whether the detected thread pattern variation indicates presence of malware can comprise comparing system level thread patterns of a same application. In some cases, determining whether the detected thread pattern variation indicates presence of malware can additionally, or alternatively comprise determining an importance of a thread having a detected thread pattern variation based on one or more user defined weights for the thread.

The plurality of threads can, in some cases, execute on a plurality of devices. In such cases, in response to detecting a thread pattern variation on a first device of the plurality of devices, information identifying the thread pattern variation can be sent from the first device to a second device of the plurality of devices and a determination can be made by the second device as to whether a same thread pattern variation is detected on the second device. Network level thread pattern variation can additionally, or alternatively, be detected between the devices. In some cases, the thread pattern for each thread can additionally, or alternatively, be compared to the stored information defining one or more known patterns for thread execution for a distributed application executing across the plurality of devices. In other cases, the thread pattern for a new thread on a first device of the plurality of devices can additionally, or alternatively, be compared to stored information defining one or more known patterns for the same thread previously executed on a second device of the plurality of devices.

The stored information defining one or more known patterns for thread execution can be updated using machine learning and based on execution of the plurality of threads. The machine learning can comprise one or more of unsupervised machine learning or supervised machine learning.

One or more actions can be performed based on determining the detected thread pattern variation indicates the presence of malware. For example, performing one or more actions based on determining the detected thread pattern variation indicates the presence of malware can comprise one or more of quarantining a thread having a detected thread pattern variation, blocking a thread having a detected thread pattern variation from accessing resources, flagging a thread having a detected thread pattern variation, providing thread pattern variation identification information and/or others.

According to another embodiment, a system can comprise a processor and a memory coupled with and readable by the processor and storing therein a set of instructions which, when executed by the processor, causes the processor to detect malware associated with process threads by capturing context information for each thread of a plurality of threads executing on the processor. The context information can define a thread pattern for the thread. For example, the context information can comprise one or more of thread execution time, time between successive executions of two or more threads, time between successive executions of the same thread, file access by the thread, Input/Output (I/O) access by the thread, keyboard tracking by the thread, network traffic related to the thread, ports used by the thread, destination addresses used by the thread, system Application Program Interface (API) usage by the thread, copy of data to other devices performed by the thread, stack information of the thread upon instantiation of the thread, stack variables of the thread, stack information of the thread upon exit of the thread, and/or others.

The instructions can further cause the processor to compare the thread pattern for each thread executing on the processor to stored information defining one or more known patterns for thread execution based on previous execution of one or more threads and detect a thread pattern variation based on the comparing of the thread pattern for each thread of the plurality of threads to the stored information defining the one or more known thread patterns. The thread pattern variation can be detected when the thread pattern for one or more threads of the plurality of threads does not match the stored information defining the one or more known thread patterns.

In some cases, comparing the thread pattern for a thread executing on the processor to stored information defining one or more known patterns for thread execution can comprise comparing a thread pattern from a current execution of the thread to a previous execution of the same thread. In such cases, the thread pattern variation can comprise one or more of a change in a size of a stack for the thread, a change in data in the stack for the thread, a change in a size of a heap for the thread, a change in data in the heap for the thread, a change in a size of code for the thread, and/or others. Additionally, or alternatively, the thread pattern variation can comprise one or more of a new thread pattern, a new type of API call, a type of API call associated with malware, a new sequence of API calls, a change in an order of two or more threads, a missing thread, two or more threads previously executing in series now executing in parallel, two or more threads previously executing in parallel now executing in series, a change in an amount of time for a thread to execute, a change in an amount of time between executions of a thread, a change in thread priority for a thread, a thread that does not occur within a defined time period, a missing thread that is spun from an existing thread, a new thread that is spun from an existing thread, a missing thread that was previously identified as needed, a thread that does not occur at a predefined period, a thread that does not occur in response to an event associated with the thread, a number of thread occurrences that exceeds a predefined threshold, and/or others.

The instructions can further cause the processor to determine whether the detected thread pattern variation indicates presence of malware. For example, determining whether the detected thread pattern variation indicates presence of malware can comprise comparing system API usage for a thread having a detected thread pattern variation to previous system API usage for the thread. Additionally, or alternatively, determining whether the detected thread pattern variation indicates presence of malware can comprise comparing file access for a thread having a detected thread pattern variation to previous to previous file access for the thread. In another example, determining whether the detected thread pattern variation indicates presence of malware can comprise comparing I/O access for a thread having a detected thread pattern variation to previous I/O access for the thread. In some cases, determining whether the detected thread pattern variation indicates presence of malware can additionally or alternatively comprise comparing network traffic for a thread having a detected thread pattern variation to previous network traffic for the thread. In other cases, determining whether the detected thread pattern variation indicates presence of malware can additionally, or alternatively, comprise comparing network addresses used by a thread having a detected thread pattern variation to previous network addresses used by the thread. Additionally, or alternatively, determining whether the detected thread pattern variation indicates presence of malware can comprise comparing API usage for a thread having a detected thread pattern variation to previous API usage for the thread. Determining whether the detected thread pattern variation indicates presence of malware can additionally, or alternatively comprise comparing the context information for threads previously running in series but which are now running in parallel. In yet another example, determining whether the detected thread pattern variation indicates presence of malware can additionally, or alternatively, comprise comparing a file history for a thread having a detected thread pattern variation to a previous file history for the thread. Additionally, or alternatively, determining whether the detected thread pattern variation indicates presence of malware can comprise dynamically comparing thread to thread context information for each of the plurality of threads. In yet another example, determining whether the detected thread pattern variation indicates presence of malware can comprise comparing system level thread patterns of a same application. In some cases, determining whether the detected thread pattern variation indicates presence of malware can additionally, or alternatively comprise determining an importance of a thread having a detected thread pattern variation based on one or more user defined weights for the thread.

The plurality of threads can, in some cases, execute on a plurality of devices. In such cases, the instructions can further cause the processor to, in response to detecting a thread pattern variation on a first device of the plurality of devices, send information identifying the thread pattern variation from the first device to a second device of the plurality of devices and a determination can be made by the second device as to whether a same thread pattern variation is detected on the second device. Additionally, or alternatively, the instructions can cause the processor to detect network level thread pattern variation between the devices. In some cases, the instructions can additionally, or alternatively, cause the processor to compare the thread pattern for each thread to the stored information defining one or more known patterns for thread execution for a distributed application executing across the plurality of devices. In other cases, the instructions can additionally, or alternatively, cause the processor to compare the thread pattern for a new thread on a first device of the plurality of devices to stored information defining one or more known patterns for the same thread previously executed on a second device of the plurality of devices.

The instructions can cause the processor to, in some cases, update the stored information defining one or more known patterns for thread execution using machine learning and based on execution of the plurality of threads. The machine learning can comprise one or more of unsupervised machine learning or supervised machine learning.

The instructions can cause the processor to perform one or more actions based on determining the detected thread pattern variation indicates the presence of malware. For example, performing one or more actions based on determining the detected thread pattern variation indicates the presence of malware can comprise one or more of quarantining a thread having a detected thread pattern variation, blocking a thread having a detected thread pattern variation from accessing resources, flagging a thread having a detected thread pattern variation, providing thread pattern variation identification information and/or others.

According to yet another embodiment, a non-transitory, computer-readable medium can comprise a set of instructions stored therein which, when executed by a processor, causes the processor to detect malware associated with process threads by capturing context information for each thread of a plurality of threads executing on the processor. The context information can define a thread pattern for the thread. For example, the context information can comprise one or more of thread execution time, time between successive executions of two or more threads, time between successive executions of the same thread, file access by the thread, Input/Output (I/O) access by the thread, keyboard tracking by the thread, network traffic related to the thread, ports used by the thread, destination addresses used by the thread, system Application Program Interface (API) usage by the thread, copy of data to other devices performed by the thread, stack information of the thread upon instantiation of the thread, stack variables of the thread, stack information of the thread upon exit of the thread, and/or others.

The instructions can further cause the processor to compare the thread pattern for each thread executing on the processor to stored information defining one or more known patterns for thread execution based on previous execution of one or more threads and detect a thread pattern variation based on the comparing of the thread pattern for each thread of the plurality of threads to the stored information defining the one or more known thread patterns. The thread pattern variation can be detected when the thread pattern for one or more threads of the plurality of threads does not match the stored information defining the one or more known thread patterns.

In some cases, comparing the thread pattern for a thread executing on the processor to stored information defining one or more known patterns for thread execution can comprise comparing a thread pattern from a current execution of the thread to a previous execution of the same thread. In such cases, the thread pattern variation can comprise one or more of a change in a size of a stack for the thread, a change in data in the stack for the thread, a change in a size of a heap for the thread, a change in data in the heap for the thread, a change in a size of code for the thread, and/or others. Additionally, or alternatively, the thread pattern variation can comprise one or more of a new thread pattern, a new type of API call, a type of API call associated with malware, a new sequence of API calls, a change in an order of two or more threads, a missing thread, two or more threads previously executing in series now executing in parallel, two or more threads previously executing in parallel now executing in series, a change in an amount of time for a thread to execute, a change in an amount of time between executions of a thread, a change in thread priority for a thread, a thread that does not occur within a defined time period, a missing thread that is spun from an existing thread, a new thread that is spun from an existing thread, a missing thread that was previously identified as needed, a thread that does not occur at a predefined period, a thread that does not occur in response to an event associated with the thread, a number of thread occurrences that exceeds a predefined threshold, and/or others.

The instructions can further cause the processor to determine whether the detected thread pattern variation indicates presence of malware. For example, determining whether the detected thread pattern variation indicates presence of malware can comprise comparing system API usage for a thread having a detected thread pattern variation to previous system API usage for the thread. Additionally, or alternatively, determining whether the detected thread pattern variation indicates presence of malware can comprise comparing file access for a thread having a detected thread pattern variation to previous to previous file access for the thread. In another example, determining whether the detected thread pattern variation indicates presence of malware can comprise comparing I/O access for a thread having a detected thread pattern variation to previous I/O access for the thread. In some cases, determining whether the detected thread pattern variation indicates presence of malware can additionally or alternatively comprise comparing network traffic for a thread having a detected thread pattern variation to previous network traffic for the thread. In other cases, determining whether the detected thread pattern variation indicates presence of malware can additionally, or alternatively, comprise comparing network addresses used by a thread having a detected thread pattern variation to previous network addresses used by the thread. Additionally, or alternatively, determining whether the detected thread pattern variation indicates presence of malware can comprise comparing API usage for a thread having a detected thread pattern variation to previous API usage for the thread. Determining whether the detected thread pattern variation indicates presence of malware can additionally, or alternatively comprise comparing the context information for threads previously running in series but which are now running in parallel. In yet another example, determining whether the detected thread pattern variation indicates presence of malware can additionally, or alternatively, comprise comparing a file history for a thread having a detected thread pattern variation to a previous file history for the thread. Additionally, or alternatively, determining whether the detected thread pattern variation indicates presence of malware can comprise dynamically comparing thread to thread context information for each of the plurality of threads. In yet another example, determining whether the detected thread pattern variation indicates presence of malware can comprise comparing system level thread patterns of a same application. In some cases, determining whether the detected thread pattern variation indicates presence of malware can additionally, or alternatively comprise determining an importance of a thread having a detected thread pattern variation based on one or more user defined weights for the thread.

The plurality of threads can, in some cases, execute on a plurality of devices. In such cases, the instructions can further cause the processor to, in response to detecting a thread pattern variation on a first device of the plurality of devices, send information identifying the thread pattern variation from the first device to a second device of the plurality of devices and a determination can be made by the second device as to whether a same thread pattern variation is detected on the second device. Additionally, or alternatively, the instructions can cause the processor to detect network level thread pattern variation between the devices. In some cases, the instructions can additionally, or alternatively, cause the processor to compare the thread pattern for each thread to the stored information defining one or more known patterns for thread execution for a distributed application executing across the plurality of devices. In other cases, the instructions can additionally, or alternatively, cause the processor to compare the thread pattern for a new thread on a first device of the plurality of devices to stored information defining one or more known patterns for the same thread previously executed on a second device of the plurality of devices.

The instructions can cause the processor to, in some cases, update the stored information defining one or more known patterns for thread execution using machine learning and based on execution of the plurality of threads. The machine learning can comprise one or more of unsupervised machine learning or supervised machine learning.

The instructions can cause the processor to perform one or more actions based on determining the detected thread pattern variation indicates the presence of malware. For example, performing one or more actions based on determining the detected thread pattern variation indicates the presence of malware can comprise one or more of quarantining a thread having a detected thread pattern variation, blocking a thread having a detected thread pattern variation from accessing resources, flagging a thread having a detected thread pattern variation, providing thread pattern variation identification information and/or others.

Figure 1:
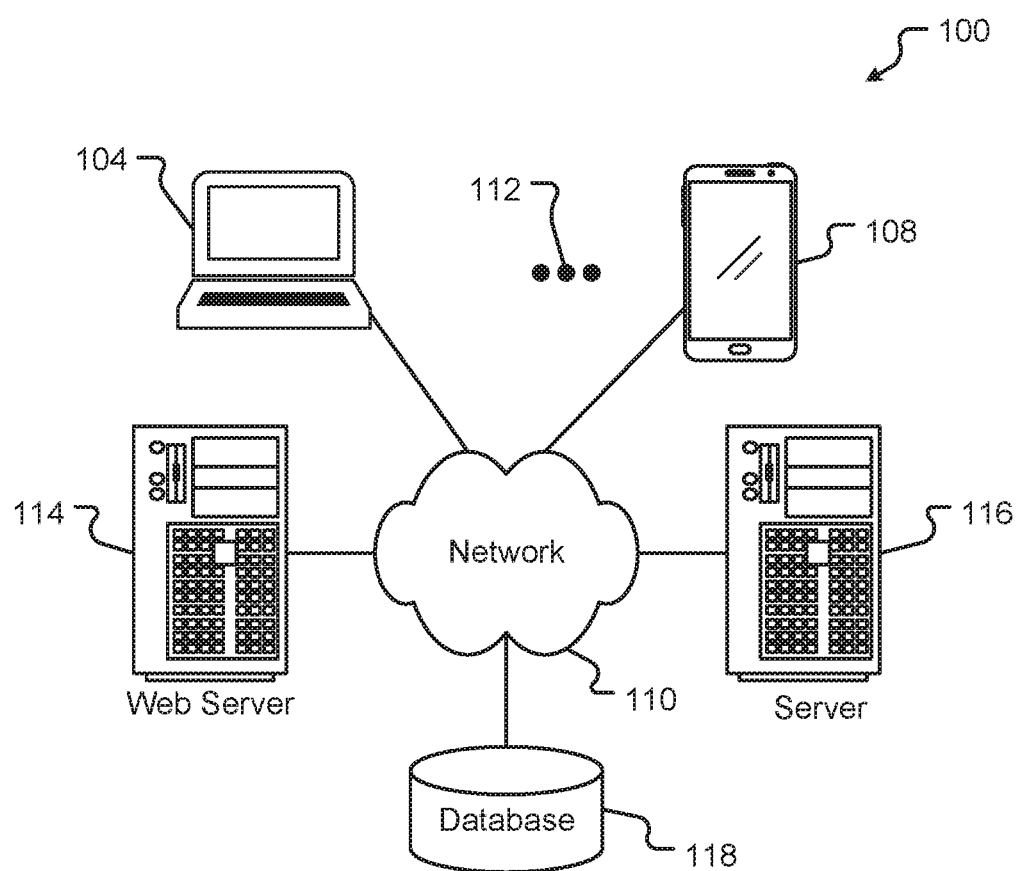
FIG. 1 is a block diagram illustrating elements of an exemplary computing environment in which embodiments of the present disclosure may be implemented.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a Local-Area Network (LAN) and/or Wide-Area Network (WAN) such as the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, Non-Volatile Random-Access Memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a Compact Disk Read-Only Memory (CD-ROM), any other optical medium, punch cards, paper tape, any other physical medium with patterns of holes, a Random-Access Memory (RAM), a Programmable Read-Only Memory (PROM), and Erasable Programmable Read-Only Memory (EPROM), a Flash-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, Radio Frequency (RF), etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as Programmable Logic Device (PLD), Programmable Logic Array (PLA), Field Programmable Gate Array (FPGA), Programmable Array Logic (PAL), special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or Very Large-Scale Integration (VLSI) design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or Common Gateway Interface (CGI) script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices, such as a computing device 104, a communication device 108, and/or more 112. The computing devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 104, 108, 112 may also have any of a variety of applications, including for example, database client and/or server applications, and web browser applications. Alternatively, the computing devices 104, 108, 112 may be any other electronic device, such as a thin-client computer, Internet-enabled mobile telephone, and/or personal digital assistant, capable of communicating via a network 110 and/or displaying and navigating web pages or other types of electronic documents. Although the exemplary computer environment 100 is shown with two computing devices, any number of user computers or computing devices may be supported.

Environment 100 further includes a network 110. The network 110 may can be any type of network familiar to those skilled in the art that can support data communications using any of a variety of commercially-available protocols, including without limitation Session Initiation Protocol (SIP), Transmission Control Protocol/Internet Protocol (TCP/IP), Systems Network Architecture (SNA), Internetwork Packet Exchange (IPX), AppleTalk, and the like. Merely by way of example, the network 110 maybe a Local Area Network (LAN), such as an Ethernet network, a Token-Ring network and/or the like; a wide-area network; a virtual network, including without limitation a Virtual Private Network (VPN); the Internet; an intranet; an extranet; a Public Switched Telephone Network (PSTN); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP servers, HyperText Transfer Protocol (secure)

(HTTP(s)) servers, FTP servers, CGI servers, database servers, Java servers, and the like. In some instances, the web server 114 may publish operations available operations as one or more web services.

The environment 100 may also include one or more file and or/application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server 116, 114 may execute one or more web applications. The web application may be implemented as one or more scripts or programs written in any programming language, such as Java™, C, C#®, or C++, and/or any scripting language, such as Perl, Python, or Tool Command Language (TCL), as well as combinations of any programming/scripting languages. The application server(s) 116 may also include database servers, including without limitation those commercially available from Oracle®, Microsoft®, Sybase®, IBM® and the like, which can process requests from database clients running on a computing device 104, 108, 112.

The web pages created by the server 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer systems 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a Storage-Area Network (SAN) familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to Structured Query Language (SQL) formatted commands.

Figure 2:
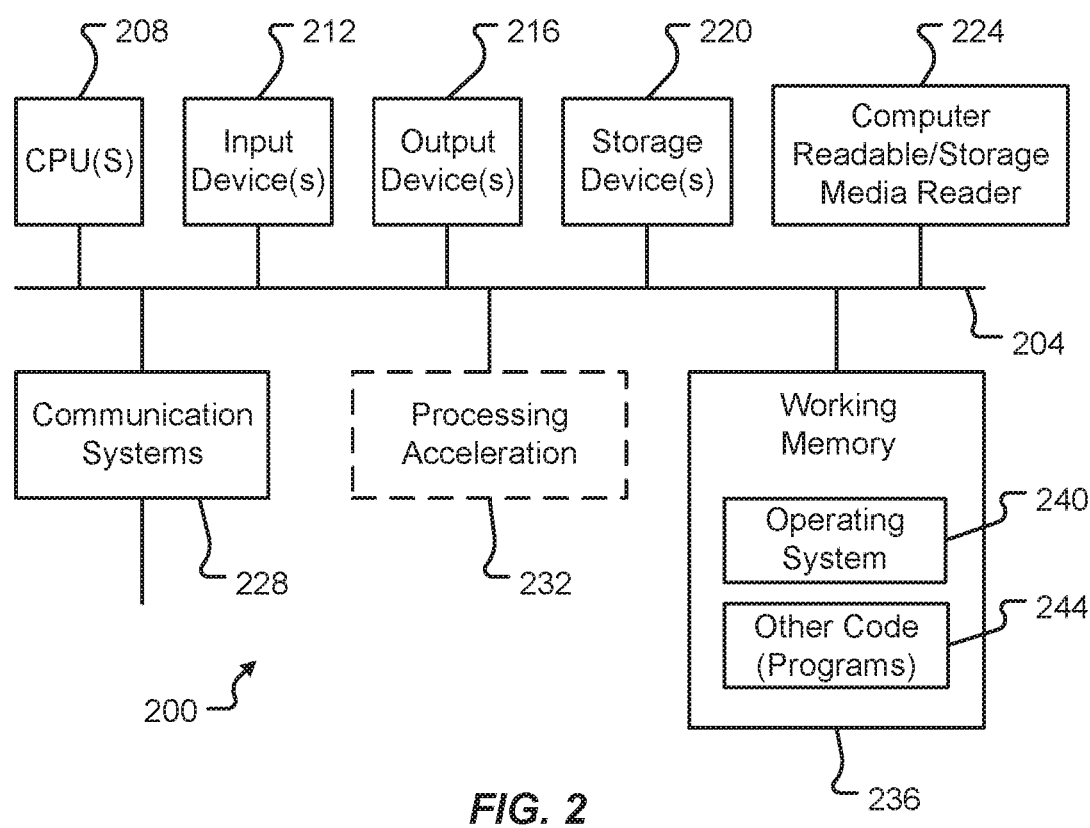
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices, or other systems or components described above may be deployed or executed. The computer system 200 is shown comprising hardware elements that may be electrically coupled via a bus 204. The hardware elements may include one or more Central Processing Units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a Random-Access Memory (RAM) and/or a Read-Only Memory (ROM), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a Digital Signal Processor (DSP), a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3:
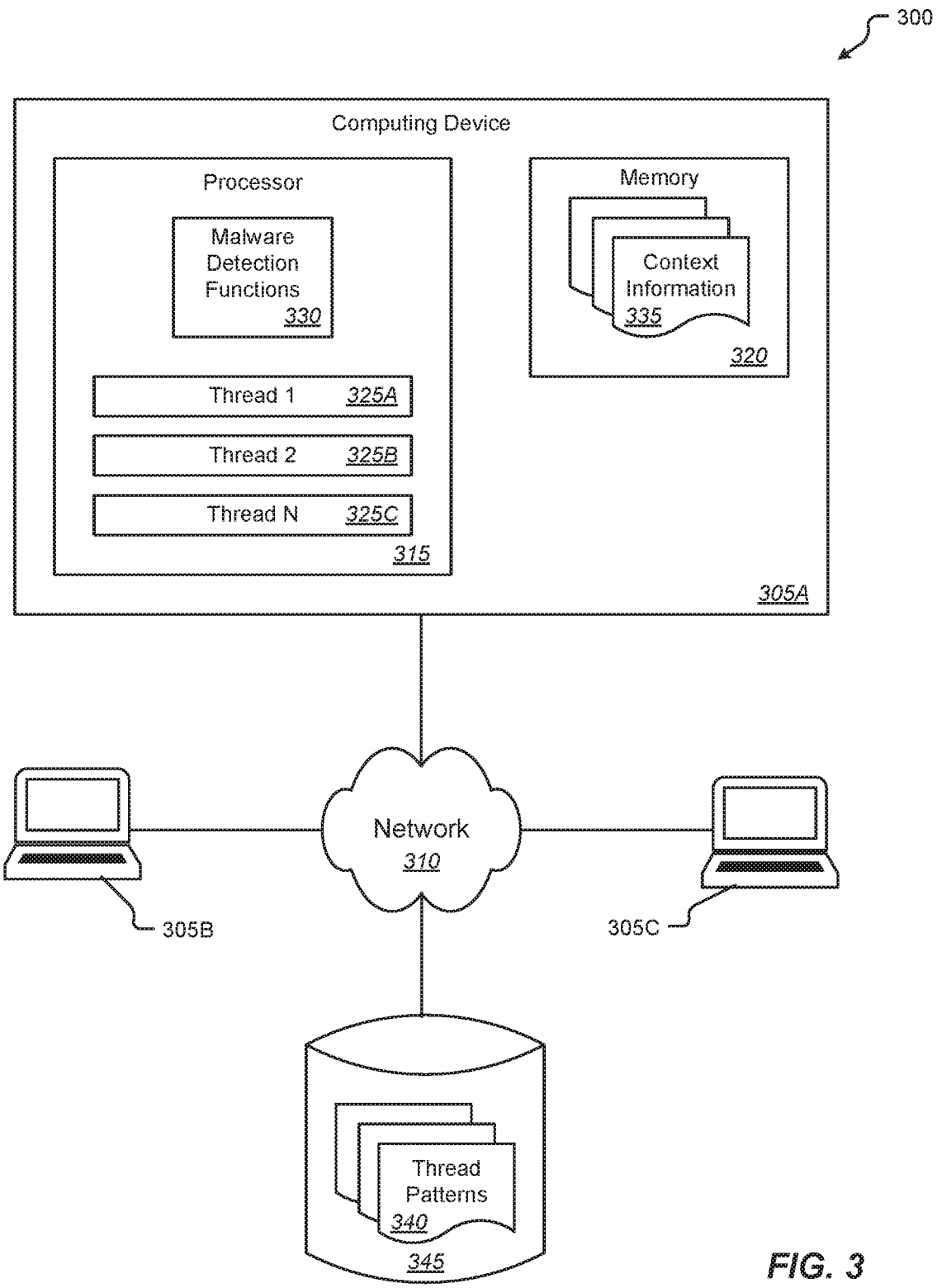
FIG. 3 is a block diagram illustrating elements of an exemplary environment malware detection can be performed according to one embodiment of the present disclosure.

FIG. 3 is a block diagram illustrating elements of an exemplary environment malware detection can be performed according to one embodiment of the present disclosure. As used herein, the term malware refers to software designed to intentionally damage or disrupt one or more computer systems and/or gain unauthorized access to one or more computer systems and/or computing resources. Malware can include, but is not limited to, viruses, worms, Trojans, bots, ransomware, adware, spyware, and others. As illustrated in the example of FIG. 3, the environment 300 can include one or more computing devices 305A-305C such as any of the servers and/or other computing devices described above. Each computing device 305A-305C may be communicatively coupled with one or more others of the computing devices 305A-305C via a network 310 such as any of the networks described above.

As exemplary computing device 305A according to embodiments described herein can comprise a processor 315 and a memory 320 such as described above. The processor 315 can execute any number of process threads 325A-325C as known in the art. The processor 315 can also execute a set of malware detection functions 330. The malware detection functions 330 can monitor execution of the process threads 325A-325C and collect for each process thread 325A-325C a set of context information 335. The context information 335 can be stored in the memory 320 of the computing device 305A as illustrated here or may, in other implementations, be stored elsewhere, e.g., in a repository (not shown here) accessible by the computing device 305A. The context information 325 for each thread can define a thread pattern for that thread.

The environment 300 can also include a repository 345 of thread patterns 340. These stored thread patterns 340 can define patterns detected for the same or similar threads on previous executions. The thread patterns defined by the context information 335 for each thread 325A-325C can be compared by the malware detection functions 330 to the set of stored thread patterns 340 to identify previously undetected patterns. In other words, embodiments of the present disclosure use existing thread patterns identified in context information 335 to identify new potential malware in a computing device 305A or network by comparing previous, known thread patterns 340 and/or information to the current information 335. By looking at thread patterns over time for specific application(s), servers, operating systems, etc., variances can be identified. If the thread pattern varies, this anomalous event can be noted and, in some cases, corrective action can be taken, e.g., the thread can be dynamically blocked and/or quarantined. For example, if a specific application has a learned thread pattern, but a new thread is detected that was never in the thread pattern previously, e.g., on that same computing device or across different computing devices, the thread generating the new thread may be quarantined, blocked, or noted to further determine its behavior. The thread generating the new thread pattern may be quarantined to determine it tries to access the network or do file I/O in a new way that the thread did not do before, e.g., encrypting files like normally done by ransomware.

More specifically, as process threads 325A-325C normally execute, thread context information 335 can be captured by the malware detection functions 330. The context information 335 can include, but is not limited to, information such as thread execution time, time between threads or between the same threads, File/IO access, keyboard tracking, network traffic based on the thread, ports, e.g., ports used by the thread, destination addresses used by the thread, system API usage by the thread, copy of data to other devices, stack information of the thread, both upon instantiation of the thread and exit of the thread, stack variables of the thread, etc. In some cases, the context information 335 collected by the malware detection functions 330 may be more limited until an anomaly in the thread pattern or thread pattern variation is detected. The thread patterns represented by the context information 335 can include, but are not limited to, new thread(s) in the pattern, changes in thread orders, missing threads, threads now executing in parallel, parallel threads now executing in series, etc.

The malware detection functions 330 can include tracking information associated with each thread over time. When a thread 325A executes, the thread 325A has memory and information associated with the thread 325A that can be gathered from the operating system of the computing device 305A. This data can be analyzed to identify variances from previous loads of the same thread 325A. For example, if the size of the stack and/or data segment for the thread 325A is dramatically larger or smaller than previously learned, e.g., sizes never seen before, this could be used to identify possible malware. Stack pointers can be used to determine the stack size. In some cases, the malware detection functions 330 may check the data on the stack as well to see if there are variances versus previous executions of the thread 325A.

Additionally, or alternatively, the malware detection functions 330 may also check differences in the heap. For example, if the size of the heap dramatically changes, this may indicate an anomaly. Data in the heap may also be analyzed nu the malware detection functions 330 to determine thread pattern variations.

A thread 325A is typically associated with a specific block of code of the application. In some cases, the operating system of the computing device 305A can make this information available and the malware detection functions 330 can use this to determine if the size of the code for the thread 325A has now changed. For example, if the size of the code for the thread 325A was initially 10K bytes and now what is loaded is 20K bytes, this thread pattern variation can be considered to indicate possible malware.

The malware detection functions 330 can additionally, or alternatively, identify specific types of new API calls, such as operating system calls, that are being made in the thread 325A, e.g., in a changed thread or a completely new thread, that were not previously being made. This could include a list of API calls that are typically associated with malicious code to determine whether any of these new API calls are being made in the new thread or changed thread. For example, if the thread 325A now has a system call that opens up a stream to an external IP address this can be considered to indicate possible malware.

Additionally, or alternatively, the malware detection functions 330 can analyze an API sequence of the thread 325A to determine whether it varies from previous API sequences of the thread 325A. For example, if there were two learned regular API sequences (e.g., A1-A2-A3-A4 and A1-A2-A5-A6), and a new pattern is determined (e.g., A1-A7-A8-A9) where A7-A9 have never been called before in any API sequence, this may be identified by malware detection functions 330 as a thread pattern variance that indicates possible malware.

Detecting thread pattern variations by the malware detection functions 330 can include determining whether a particular thread 325A is taking longer or shorter time to execute, changing file I/O, changing network traffic, and/or changing system API usage compared to previous patterns or thread context. For example, if the time between thread executions changes, this could indicate possible malware and the malware detection functions 330 could then further compare the thread context information 330 and stored thread patterns 340 in more detail.

If the time between execution of the same thread 325A occurs, e.g., a thread that occurs on a regular basis, this could be identified by the malware detection functions 330 as a thread pattern variation indicative of possible malware. For example, if a key thread, such as an antivirus thread, has been starved by a higher priority thread, the higher priority thread may be malicious. In other words, inter process threads can be checked to see thread prioritization. This can be extended to thread patterns among computer cores. For example, a thread pattern of T1-C1-T2-C2 may be a learned thread pattern 340.

If a new thread 325A occurs, the malware detection functions 330 can check the context information 335 for that thread 325A for such as, file I/O, network traffic, system API usage, etc. In some cases, this check may be made by comparing thread patterns 340 for other threads 325B and/or 325C. If a thread pattern variation is detected, the malware detection functions 330 can quarantine or block the new thread 325A.

If a thread 325A is missing, the malware detection functions 330 can check remaining threads 325B and 325C for thread pattern variations. The malware detection functions 330 can identify key threads 325A that, if missing, are problematic or indicative of possible malware in another thread 325B and/or 325C. For example, if an audit thread of an antivirus system is no longer called or has been significantly delayed this thread can be identified as missing and indicative of the presence of malware. Key threads, such as threads of an antivirus application, for example, can be identified and the malware detection functions 330 can detect the presence of malware if any of these threads no longer occur within a defined or learned time period.

The malware detection functions 330 can, in some cases, detect a missing thread that is spun from an existing thread or a new thread that is spun from an existing thread. This could be used to identify missing threads during development. For example, if a specific type of audit thread is required for a specific event, e.g., a login, then it could be identified as a key thread during development.

The malware detection functions 330 can, additionally, or alternatively, identify periodic threads or periodic thread occurrences that can be learned by the malware detection functions 330 over time. For example, a periodic virus scanner thread that does a background virus scan each week can be identified or learned by the malware detection functions 330 based on the context information 335 and stored thread patterns 340 and can be detected as missing by the malware detection functions 330 if that thread no longer happens at the expected time. Similarly, threads can be associated by the malware detections functions 330 with particular events. For example, a virus scanner thread may be run for every email message. If an email is received but there is no associated virus scanner thread, this could be identified by the malware detection functions 330 as indicative of the presence of possible malware. In this example, an event/thread association can be used by the malware detection functions 330 to detect a thread pattern variation from what previously occurred. There may be a series of events associated with a thread(s). Likewise, the malware detection functions 330 can check for the opposite, e.g., if a specific API call is expected to occur in a thread 325A and the API call based on the stored thread patterns 340 but does not happen when the thread 32A occurs, the malware detection functions 330 can detect this thread pattern variation. In some cases, there can be multiple threads associated with a single event.

Additionally, or alternatively, the malware detection functions 330 can determine whether threads 325A and 325B and/or 325C are now being executed in parallel versus previously being performed serially. Similarly, the malware detection functions 330 can determine whether threads 325A and 325B and/or 325C are now being executed in series versus previously being performed in parallel. In either case, the malware detection functions 330 can compare the thread context information 335 to the previous thread patterns for the threads 325A-325C.

In some cases, in response to detecting a thread pattern variation, the malware detection functions 330 can then check a file history associated with a thread 325A to determine whether there was a change in the file. For example, a check can be made by the malware detection functions 330 as to whether a DLL or Java file changed or was replaced and, if so, by what, e.g., by being copied from another device, etc. This information can then be provided by the malware detection functions 330 as part of thread pattern variation identification, e.g., as an alert, report, etc.

In some cases, the malware detection functions 330 can dynamically compare the context information 335 between one or more executing threads 325A-325C.

According to one embodiment, the malware detection functions 330 can check thread patterns on multiple computing devices 305A-305C across the network 310. For example, if a thread pattern variation is detected as described above, the malware detection functions 330 could send this information to other devices 305B and/or 305C to determine whether the same or a similar thread pattern variation is detected there. Additionally, or alternatively, the malware detection functions 330 could compare system level thread patterns of the same application to each other to identify a thread pattern variation on an application that is running on a specific device. For example, if there are ten instances of the application running on the network and all have similar thread patterns, when a thread pattern variation is found and this could indicate that malware has become active on one of the devices.

According to one embodiment, the malware detection functions 330 can use such network level anomaly detection to identify various types of viruses that are difficult to detect. Such a network-level approach can be used to associate code replication and/or thread patterns between computing devices 305A-305C to replicate the code. For example, if a virus copies malicious code between servers that then do their damage and then self-delete themselves, the system-level context information of each server can be used to identify the thread pattern of the virus across multiple computing devices and further identify where the malicious code is being copied. In such an example, there may be a copy thread and associated execution threads of the malware that is copied to multiple servers that could capture as a network-wide thread pattern. Additionally, or alternatively, the malware detection functions 330 can detect network-level thread pattern variations based on a client/server or server/server thread patterns of distributed applications. For example, if the network level thread pattern changed from S1-C1-S2-C2-C3 to S1-C1-52-C4-53-C3-C2, the new threads C4/S3 can be identified by the malware detection functions 330 as indicative of possible malware and the thread context can be further investigated. The malware detection functions 330 can additionally, or alternatively, look for thread pattern variations in system or network-wide thread patterns for all executing applications. For example, if a new executable gets launched for a specific application, the thread pattern of the new executable can be compared to system thread patterns on a particular computing device 305A or network-wide patterns for the same application running on other computing devices 305B and/or 305C.

The malware detection functions 330 can additionally, or alternatively, check for thread priority manipulation. For example, if the thread priority of the antivirus system thread 325A is changed to a low priority and now a new, higher priority thread 325B occurs that continually starves the antivirus system thread 325A, this thread pattern variation can be detected by the malware detection functions 330 and identified as indicating possible malware, e.g., in the new thread 325B. In other words, a thread queue represented in the context information 335 can be analyzed and compared to a learned thread priority queue represented in the stored thread patterns 340. This can be done on an individual thread basis or based on a learned thread pattern where thread priority can be used in conjunction with the thread pattern. For example, a learned thread pattern may consist of T1(P2)-T2-(P2)-T3(P2) for Application A. A thread pattern variation can be identified as T1(P1)-T2-(P1)-T3(P1) where threads T1-T3 all had their thread priority increased even though the thread pattern is the same for Application A.

Thread patterns may also be used by the malware detection functions 330 to identify known viruses in a similar manner to existing virus scanners (except that the pattern is a thread pattern versus an API pattern). For example, if Virus A exhibits a specific thread pattern that is known, the system could identify Virus A when the known thread pattern for Virus A is seen. This may also be able to detect when Virus A has been changed so that its API pattern changes, but the thread pattern remains the same.

The malware detection functions 330 can additionally, or alternatively, maintain user defined weights that can be used to identify an importance of a thread when determining whether a detected thread pattern variation in indicative of possible malware. In such cases, important threads that relate to security may be given a higher weighting. For example, an antivirus thread may be given a high priority. Additionally, or alternatively, a background garbage collection thread may be given a high priority because the system could be starved of memory if the garbage collection thread stopped running. In such cases, the malware detection functions 330 can, when comparing the context information 335 for such a thread 325A to the stored thread patterns 340, expect a higher degree of match than other, low weighted threads.

Thread pattern variations may be identified by the malware detection functions 330 based on a variety of other unusual occurrences of a thread. For example, if a print thread is spun off an unusual number of times, e.g., a user is now printing an unusually high number of documents, this may indicate a suspicious activity of a user. In other words, a threshold of thread occurrences that vary from a learned pattern may be used by the malware detection functions 330 to identify thread pattern variations.

As noted above, the malware detection functions 330 can apply machine learning based on the context information 335 and stored thread patterns 340. For example, the malware detection functions 330 can learn the anomalous behavior using unsupervised machine learning as descried in "A Review of Anomaly based Intrusion Detection Systems" by Jyothsna & Prasad, *International Journal of Computer Applications* (0075-8887) Volume 28-No. 7, September 2011 which is incorporated herein by reference and that used unsupervised machine learning for network traffic. However, instead of using network traffic as the input, the malware detection functions 330 can use the thread context information 335 as input into the unsupervised machine learning process to update the stored, i.e., learned, thread patterns 340. Examples of unsupervised machine learning can include, but are not limited to, a Markov Process or Marker Model, a Statistical Moments or mean and standard deviation model, a Univariate Model, Multivariate Model, a Time series Model, a Cognition based, Finite State Machine Model, a Description script Model, an Adept System Model, a Machine Learning based, Baysian Model, Genetic Algorithm model, a Neural Network Model, Fuzzy Logic Model, an Outlier Detection Model, Computer Immunology based, User Intention based model and/or the like. The malware detection functions 330 may also use supervised machine learning to detect known thread signatures as described in "Machine Learning Methods for Malware Detection" by Kaspersky which is incorporated herein by reference and which discusses API function signatures. Depending upon the type of data, different machine learning models may be used. For example, for thread patterns a supervised machine learning model may be used and for anomaly detection an unsupervised machine learning model may be used.

Figure 4:
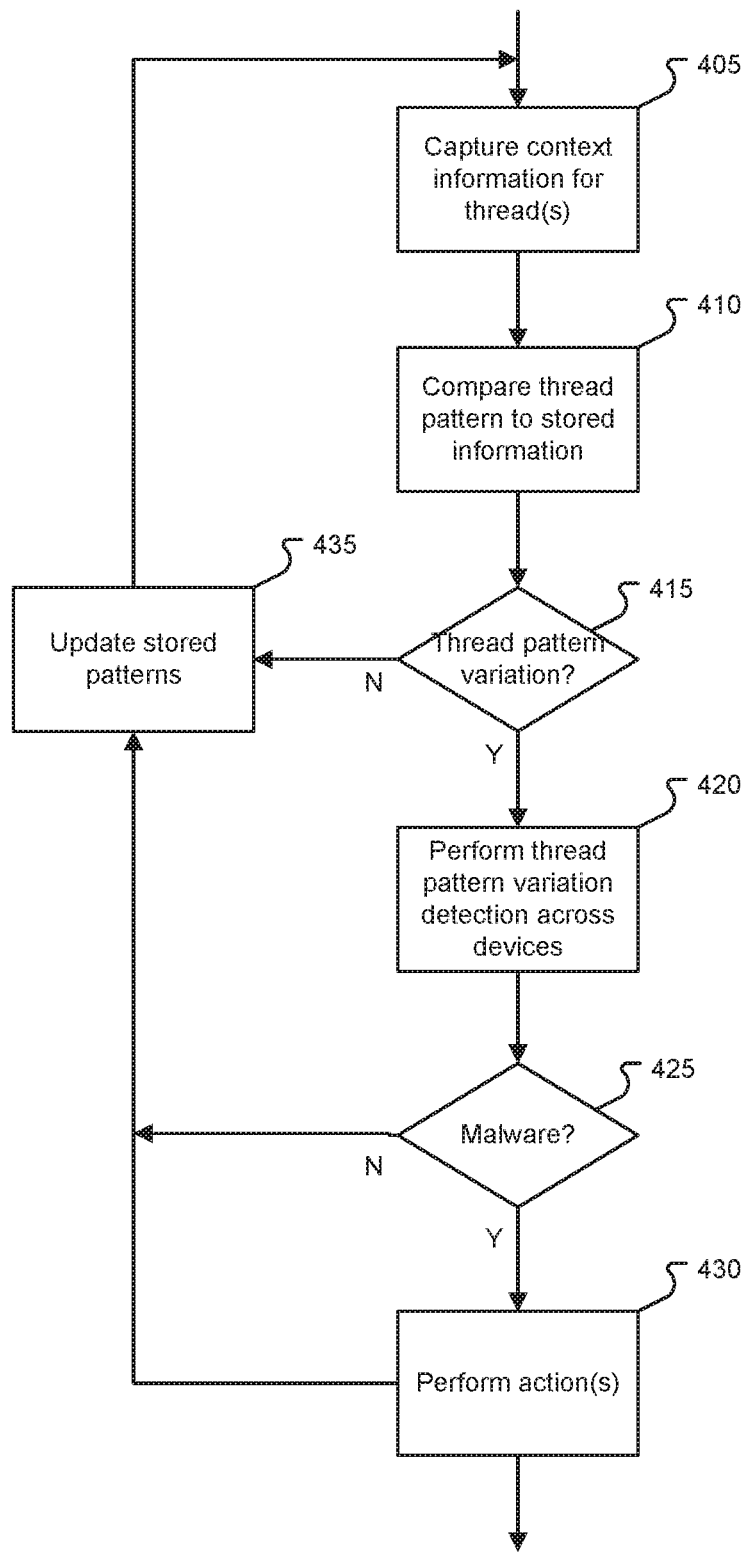
FIG. 4 is a flowchart illustrating an exemplary process for detecting malware according to one embodiment of the present disclosure.

FIG. 4 is a flowchart illustrating an exemplary process for detecting malware according to one embodiment of the present disclosure. As illustrated in this example, detecting malware associated with process threads can begin with capturing 405 context information for each thread of a plurality of threads executing on a processor. As described above, the context information can define a thread pattern for the thread. For example, the context information can comprise one or more of thread execution time, time between successive executions of two or more threads, time between successive executions of the same thread, file access by the thread, Input/Output (I/O) access by the thread, keyboard tracking by the thread, network traffic related to the thread, ports used by the thread, destination addresses used by the thread, system Application Program Interface (API) usage by the thread, copy of data to other devices performed by the thread, stack information of the thread upon instantiation of the thread, stack information of the thread upon exit of the thread, stack variables of the thread, stack information, heap information, and/or others.

The thread pattern for each thread executing on the processor can be compared 410 to stored information defining one or more known patterns for thread execution based on previous execution of one or more threads. In some cases, comparing the thread pattern for a thread executing on the processor to stored information defining one or more known patterns for thread execution can comprise comparing a thread pattern from a current execution of the thread to a previous execution of the same thread.

A determination 415 can be made as to whether a thread pattern variation has been detected based on the comparing of the thread pattern for each thread of the plurality of threads to the stored information defining the one or more known thread patterns. The thread pattern variation can be detected 415 when the thread pattern for a thread of the plurality of threads does not match the stored information defining the one or more known thread patterns. The thread pattern variation can comprise, for example, one or more of a change in a size of a stack for the thread, a change in data in the stack for the thread (e.g., variables that have been loaded on the stack), a change in a size of a heap for the thread, a change in data in the heap for the thread, a change in a size of code for the thread, and/or others. Additionally, or alternatively, the thread pattern variation can comprise one or more of a new thread pattern, a new type of API call, a type of API call associated with malware, a new sequence of API calls, a change in an order of two or more threads, a missing thread, two or more threads previously executing in series now executing in parallel, two or more threads previously executing in parallel now executing in series, a change in an amount of time for a thread to execute, a change in an amount of time between executions of a thread, a change in thread priority for a thread, a thread that does not occur within a defined time period, a missing thread that is spun from an existing thread, a new thread that is spun from an existing thread, a missing thread that was previously identified as needed, a thread that does not occur at a predefined period, a thread that does not occur in response to an event associated with the thread, a number of thread occurrences that exceeds a predefined threshold, and/or others.

As noted above, the plurality of threads can, in some cases, execute on a plurality of devices. In such cases, in response to detecting 415 a thread pattern variation on a first device of the plurality of devices, thread pattern variation detection can be performed 420 across devices. For example, information identifying the thread pattern variation can be sent from the first device to a second device of the plurality of devices and a determination can be made by the second device as to whether a same thread pattern variation is detected on the second device. Network level thread pattern variation can additionally, or alternatively, be detected between the devices. In some cases, the thread pattern for each thread can additionally, or alternatively, be compared to the stored information defining one or more known patterns for thread execution for a distributed application executing across the plurality of devices. In other cases, the thread pattern for a new thread on a first device of the plurality of devices can additionally, or alternatively, be compared to stored information defining one or more known patterns for the same thread previously executed on a second device of the plurality of devices.

Whether a thread pattern variation is detected on a single device or across more than one device, a further determination 425 can be made as to whether the detected thread pattern variation indicates presence of malware. Generally speaking, determining 425 whether a thread pattern variation is potentially malicious can be based on a comparison of the context information for the thread having the thread pattern variation to saved context information from previous execution of the same thread or other, different threads on the same device and/or on other devices. A determination 425 that potential malware is indicated by the thread pattern variation can be made when the comparison shows that the current thread pattern variation is outside of what the saved content information indicates to be a normal, or relatively normal, occurrence and/or when the comparison shows the current tread pattern variation to match a known pattern for malware. Additional details of various processes that can be used to determine 425 whether a thread pattern variation indicates the possible presence of malware will be described below with reference to FIG. 5.

One or more actions can be performed 430 based on determining the detected thread pattern variation indicates the presence of malware. For example, performing one or more actions based on determining the detected thread pattern variation indicates the presence of malware can comprise one or more of quarantining a thread having a detected thread pattern variation, blocking a thread having a detected thread pattern variation from accessing resources, flagging a thread having a detected thread pattern variation, providing thread pattern variation identification information and/or others.

According to one embodiment, in any event, i.e., in response to not detecting 415 a thread pattern variation, determining 425 that a detected thread pattern variation does not indicate the presence of malware, and/or determining 425 that a detected thread pattern variation does indicate the presence of malware and performing a corrective action, the stored information defining one or more known patterns for thread execution can be updated 435. For example, updating the stored information defining known thread patterns can comprise applying machine learning as described above. As noted, the machine learning can comprise various one or more types of unsupervised machine learning or supervised machine learning.

Figure 5:
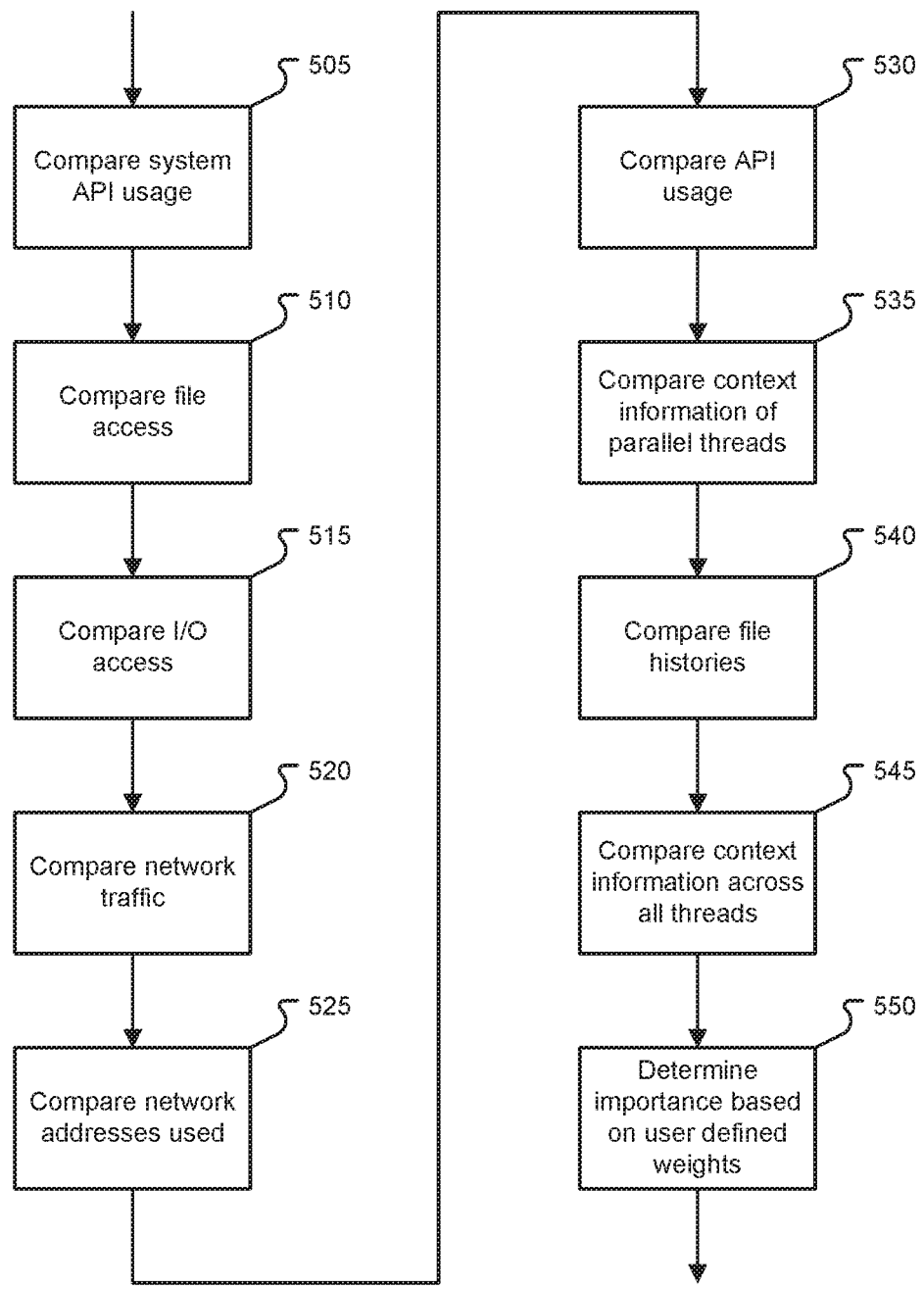
FIG. 5 is a flowchart illustrating optional processes for determining whether a thread variation indicates possible malware according to one embodiment of the present disclosure.

FIG. 5 is a flowchart illustrating optional processes for determining whether a thread pattern variation indicates possible malware according to one embodiment of the present disclosure. More specifically, this example illustrates a set of possible comparisons and/or determinations, any one or more of which may be optionally performed to determine whether a detected thread pattern variation indicates the presence of potential malware. For example, determining whether the detected thread pattern variation indicates presence of malware can comprise comparing 505 system API usage for a thread having a detected thread pattern variation to previous system API usage for the thread. For example, if the thread now has a system call that opens up a stream to an external IP address or another sequence of calls not previously made, this thread pattern variation can be identified as an anomaly indicative of possible malware.

Additionally, or alternatively, determining whether the detected thread pattern variation indicates presence of malware can comprise comparing 510 file access for a thread having a detected thread pattern variation to previous to previous file access for the thread. In another example, determining whether the detected thread pattern variation indicates presence of malware can comprise comparing 515 I/O access for a thread having a detected thread pattern variation to previous I/O access for the thread. For example, in either case, a newly detected thread may be quarantined to determine whether it tries to access the network or do file I/O in a new way that the application never did before, e.g., encrypt files such as commonly done by ransomware.

In some cases, determining whether the detected thread pattern variation indicates presence of malware can additionally or alternatively comprise comparing 520 network traffic for a thread having a detected thread pattern variation to previous network traffic for the thread. For example, ports used by the thread can be compared to prior execution of the same or different threads.

In other cases, determining whether the detected thread pattern variation indicates presence of malware can additionally, or alternatively, comprise comparing 525 network addresses used by a thread having a detected thread pattern variation to previous network addresses used by the thread. The addresses compared can comprise destination addresses used by the thread. For example, if the thread now has a system call that opens up a stream to an external IP address, this thread variation can be identified as an anomaly indicative of possible malware.

Additionally, or alternatively, determining whether the detected thread pattern variation indicates presence of malware can comprise comparing 530 API usage for a thread having a detected thread pattern variation to previous API usage for the thread. For example, specific types of new API calls that are being made in the thread, either in a changed thread or a completely new thread that were not previously being made can be identified. This could include a list of API calls that are typically associated with malicious code to determine whether any of these new API calls are being made in the new thread or changed thread. If such calls are identified, the thread pattern variation can be determined to indicate the presence of possible malware. In another example, the thread pattern variation can be analyzed, i.e., compared to prior patterns, to determine whether an API sequence of the thread varies from previous API sequences of the thread. For example, if there were two learned regular API sequences, e.g., A1-A2-A3-A4 and A1-A2-A5-A6, if a new pattern is determined, e.g., A1-A7-A8-A9, where A7-A9 have never been called before in any API sequence, this may be identified as a thread pattern variation indicative of malware. Similarly, the opposite could be checked. For example, if a specific API call is expected to occur in a thread based on the saved patterns and the API call does not happen when the thread occurs, the thread pattern variation can be determined to indicate the presence of possible malware. This is an example of a thread/event association. There could be multiple threads associated with a single event.

Determining whether the detected thread pattern variation indicates presence of malware can additionally, or alternatively comprise comparing 535 the context information for threads previously running in series but which are now running in parallel, or vis versa. For example, if threads are being executed in parallel versus previously being performed serially, this can be considered a thread pattern variation indicative of possible malware. In such cases, the thread context information can then be compared to the previous thread context information for the threads running in series. Likewise, if the threads previously ran in parallel and are now running in series, this can be considered a thread pattern variation indicative of possible malware.

In yet another example, determining whether the detected thread pattern variation indicates presence of malware can additionally, or alternatively, comprise comparing 540 a file history for a thread having a detected thread pattern variation to a previous file history for the thread. In such cases, the file history of the current thread can be compared to a file history of a previous execution of the thread to determine whether there was a change in the file that is associated with the thread. For example, the comparison can show whether a DLL or Java file was replaced and, if so, a determination can be made as to how or by what the file was replaced, e.g., by being copied from another device etc. This information can then be reported and the thread pattern variation can be identified as indicative of possible malware.

Additionally, or alternatively, determining whether the detected thread pattern variation indicates presence of malware can comprise dynamically comparing 545 thread to thread context information for each of the plurality of threads. In such cases, the system could look for variances in system wide thread patterns for all executing applications. For example, if a new executable gets launched for a specific application, the thread pattern of the new executable can be compared to system thread patterns of the same application running on other servers. The system could dynamically compare the thread/thread context information (e.g., stack information/variables). In yet another example, determining whether the detected thread pattern variation indicates the presence of malware can comprise comparing system level thread patterns of a same application. In such cases, the system could compare system level thread patterns of the same application to each other to identify an anomaly in a thread pattern for an application that is running on a specific device. For example, if there are ten instances of the application running on the network and all have similar thread patterns, when a variance is found, this could indicate that malware has become active on one of the devices.

In some cases, determining whether the detected thread pattern variation indicates presence of malware can additionally, or alternatively comprise determining 550 an importance of a thread having a detected thread pattern variation based on one or more user defined weights for the thread. In such cases, user defined weights can be used to identify an importance of a thread when determining a variation. Important threads that relate to security may be given a higher weighting. For example, an antivirus thread may be given a high priority and a background garbage collection thread may be given a high priority, e.g., because the system could be starved of memory if the garbage collection thread stopped running. Such important threads can be considered more sensitive to variations and, for example, any thread pattern variation may be considered to be indicative of possible malware.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

All of the above processes of detecting malware described herein may be done in real-time but could also be done in non-real-time or semi-real-time. This includes the identification of thread patterns and the gathering of context information associated with threads in real-time from one or more devices on a network. The key advantage to doing real-time, or even semi-real-time, processing is to quickly identify and eliminate new forms of malware. Thus, a device and/or a computer network of devices can be much more efficiently secured from malware attacks, which is impossible using existing manual processes.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for detecting malware associated with process threads, the method comprising:
   capturing, by a processor of a first device of a plurality of devices, context information for each thread of a plurality of threads executing on the processor, each device of the plurality of devices executing a distributed application, wherein the context information identifies a stored thread pattern of a plurality of stored thread patterns for the distributed application, each stored thread pattern comprising information defining one or more known patterns for thread execution based on previous execution of one or more threads;
   comparing, by the processor of the first device, the stored thread pattern for each thread executing on the processor to the stored thread pattern identified by the captured context information for each thread executing on the processor;
   detecting, by the processor of the first device, a system level thread pattern variation based on the comparing of the stored thread pattern for each thread of the plurality of threads to the stored thread patterns, wherein the system level thread pattern variation is detected when the stored thread pattern for one or more threads of the plurality of threads does not match the stored thread patterns identified by the captured context information for each thread executing on the processor;
   detecting, by the processor of the first device, a network level thread pattern variation for threads of the distributed application executing on the plurality of device replicated on the first device and at least a second device of the plurality of devices;
   determining, by the processor of the first device, whether the detected system level thread pattern variation or the detected network level thread pattern variation indicate presence of malware; and
   performing, by the processor of the first device, one or more actions based on determining the detected system level thread pattern variation or the detected network level thread pattern variation indicates the presence of malware.

2. The method of claim 1, wherein the context information comprises one or more of:
   thread execution time;
   time between successive executions of two or more threads;
   time between successive executions of the same thread;
   file access by the thread;
   Input/Output (I/O) access by the thread;
   keyboard tracking by the thread;
   network traffic related to the thread;
   ports used by the thread;
   destination addresses used by the thread;
   system Application Program Interface (API) usage by the thread;
   copy of data to other devices performed by the thread;
   stack information of the thread upon instantiation of the thread;
   stack variables of the thread; or
   stack information of the thread upon exit of the thread.

3. The method of claim 1, wherein comparing the stored thread pattern for at least one thread executing on the processor to the stored thread pattern identified by the captured context information for the at least one thread comprises comparing a thread pattern from a current execution of the thread to a previous execution of the same thread and wherein the detected system level thread pattern variation or the detected network level thread pattern variation comprises one or more of:
   a change in a size of a stack for the thread;
   a change in data in the stack for the thread;
   a change in a size of a heap for the thread;
   a change in data in the heap for the thread; or
   a change in a size of code for the thread.

4. The method of claim 1, wherein the system level thread pattern variation comprises one or more of:
   a new thread pattern;
   a new type of API call;
   a type of API call associated with malware;
   a new sequence of API calls;
   a change in an order of two or more threads;
   a missing thread;
   two or more threads previously executing in series now executing in parallel;
   two or more threads previously executing in parallel now executing in series;
   a change in an amount of time for a thread to execute;
   a change in an amount of time between executions of a thread;
   a change in thread priority for a thread;
   a thread that does not occur within a defined time period;
   a missing thread that is spun from an existing thread;
   a new thread that is spun from an existing thread;
   a missing thread that was previously identified as needed;
   a thread that does not occur at a predefined period;
   a thread that does not occur in response to an event associated with the thread; or
   a number of thread occurrences that exceeds a predefined threshold.

5. The method of claim 3, wherein determining whether the detected system level thread pattern variation indicates presence of malware further comprises one or more of:
   comparing system API usage for a thread having a detected thread pattern variation to previous system API usage for the thread;
   comparing file access for a thread having a detected thread pattern variation to previous to previous file access for the thread;
   comparing I/O access for a thread having a detected thread pattern variation to previous I/O access for the thread;
   comparing network traffic for a thread having a detected thread pattern variation to previous network traffic for the thread;
   comparing network addresses used by a thread having a detected thread pattern variation to previous network addresses used by the thread;

comparing API usage for a thread having a detected thread pattern variation to previous API usage for the thread;
comparing the context information for threads previously running in series but which are now running in parallel;
comparing a file history for a thread having a detected thread pattern variation to a previous file history for the thread;
dynamically comparing thread to thread context information for each of the plurality of threads;
comparing system level thread patterns of a same application; or
determining an importance of a thread having a detected thread pattern variation based on one or more user defined weights for the thread.

6. The method of claim 1, wherein detecting the network level thread pattern variation further comprises one or more of:
in response to detecting a thread pattern variation on the first device of the plurality of devices, sending information identifying the thread pattern variation from the first device to a second device of the plurality of devices and determining by the second device if a same thread pattern variation is detected in the distributed application executing on the second device;
comparing the stored thread pattern for each thread to stored thread patterns for the distributed application executing across the plurality of devices; or
comparing the stored thread pattern for a new thread on the first device of the plurality of devices to stored thread patterns for the same thread of the distributed application previously executed on a second device of the plurality of devices.

7. The method of claim 1, wherein performing one or more actions based on determining the detected system level thread pattern variation or the detected network level thread pattern variation indicates the presence of malware comprises one or more of:
quarantining a thread having a detected thread pattern variation;
blocking a thread having a detected thread pattern variation from accessing resources;
flagging a thread having a detected thread pattern variation; or
providing thread pattern variation identification information.

8. The method of claim 1, further comprising updating the stored thread patterns using machine learning and based on execution of the plurality of threads, wherein the machine learning comprises one or more of unsupervised machine learning or supervised machine learning.

9. A system comprising:
a processor; and
a memory coupled with and readable by the processor and storing therein a set of instructions which, when executed by the processor, causes the processor to detect malware associated with process threads by:
capturing context information for each thread of a plurality of threads executing on the processor, each device of a plurality of devices executing a distributed application, wherein the context information identifies a stored thread pattern of a plurality of stored thread patterns for the distributed application, each stored thread pattern comprising information defining one or more known patterns for thread execution based on previous execution of one or more threads;
comparing the stored thread pattern for each thread executing on the processor to the stored thread pattern identified by the captured context information for each thread executing on the processor;
detecting a system level thread pattern variation based on the comparing of the stored thread pattern for each thread of the plurality of threads to the stored thread patterns, wherein the system level thread pattern variation is detected when the stored thread pattern for one or more threads of the plurality of threads does not match the stored thread patterns identified by the captured context information for each thread executing on the processor;
detecting a network level thread pattern variation for threads of the distributed application executing on a plurality of devices replicated on the plurality of devices;
determining whether the detected system level thread pattern variation or the detected network level thread pattern variation indicates presence of malware; and
performing one or more actions based on determining the detected system level thread pattern variation or the detected network level thread pattern variation indicates the presence of malware, wherein performing one or more actions based on determining the detected system level thread pattern variation or the detected network level thread pattern variation indicates the presence of malware comprises one or more of:
quarantining a thread having a detected thread pattern variation,
blocking a thread having a detected thread pattern variation from accessing resources,
flagging a thread having a detected thread pattern variation, or
providing thread pattern variation identification information.

10. The system of claim 9, wherein the context information comprises one or more of:
thread execution time;
time between successive executions of two or more threads;
time between successive executions of the same thread;
file access by the thread;
Input/Output (I/O) access by the thread;
keyboard tracking by the thread;
network traffic related to the thread;
ports used by the thread;
destination addresses used by the thread;
system Application Program Interface (API) usage by the thread;
copy of data to other devices performed by the thread;
stack information of the thread upon instantiation of the thread;
stack variables of the thread; or
stack information of the thread upon exit of the thread.

11. The system of claim 9, wherein comparing the stored thread pattern for at least one thread executing on the processor to the stored thread pattern identified by the captured context information for the at least one thread comprises comparing a thread pattern from a current execution of the thread to a previous execution of the same thread and wherein:
the detected system level thread pattern variation or the detected network level thread pattern variation comprises one or more of:
a change in a size of a stack for the thread, a change in data in the stack for the thread,
a change in a size of a heap for the thread,
a change in data in the heap for the thread, or
a change in a size of code for the thread; and
wherein determining whether the detected system level thread pattern variation indicates presence of malware further comprises one or more of:
  comparing system API usage for a thread having a detected thread pattern variation to previous system API usage for the thread,
  comparing file access for a thread having a detected thread pattern variation to previous to previous file access for the thread,
  comparing I/O access for a thread having a detected thread pattern variation to previous I/O access for the thread,
  comparing network traffic for a thread having a detected thread pattern variation to previous network traffic for the thread,
  comparing network addresses used by a thread having a detected thread pattern variation to previous network addresses used by the thread,
  comparing API usage for a thread having a detected thread pattern variation to previous API usage for the thread,
  comparing the context information for threads previously running in series but which are now running in parallel,
  comparing a file history for a thread having a detected thread pattern variation to a previous file history for the thread,
  dynamically comparing thread to thread context information for each of the plurality of threads,
  comparing system level thread patterns of a same application, or
  determining an importance of a thread having a detected thread pattern variation based on one or more user defined weights for the thread.

12. The system of claim 9, wherein the detected system level thread pattern variation or the detected network level thread pattern variation comprises one or more of:
  a new thread pattern;
  a new type of API call;
  a type of API call associated with malware;
  a new sequence of API calls;
  a change in an order of two or more threads;
  a missing thread;
  two or more threads previously executing in series now executing in parallel;
  two or more threads previously executing in parallel now executing in series;
  a change in an amount of time for a thread to execute;
  a change in an amount of time between executions of a thread;
  a change in thread priority for a thread;
  a thread that does not occur within a defined time period;
  a missing thread that is spun from an existing thread;
  a new thread that is spun from an existing thread;
  a missing thread that was previously identified as needed;
  a thread that does not occur at a predefined period;
  a thread that does not occur in response to an event associated with the thread; or
  a number of thread occurrences that exceeds a predefined threshold.

13. The system of claim 9, wherein detecting the network level thread pattern variation comprises at least one of:
  in response to detecting a thread pattern variation on a first device of the plurality of devices, sending information identifying the thread pattern variation from the first device to a second device of the plurality of devices and determining by the second device if a same thread pattern variation is detected in the distributed application executing on the second device;
  comparing the stored thread pattern for each thread to stored thread patterns for the distributed application executing across the plurality of devices; or
  comparing the stored thread pattern for a new thread on a first device of the plurality of devices to stored thread patterns for the same thread of the distributed application previously executed on a second device of the plurality of devices.

14. The system of claim 9, wherein the set of instructions further cause the processor to update the plurality of stored thread patterns-using machine learning and based on execution of the plurality of threads, wherein the machine learning comprises one or more of unsupervised machine learning or supervised machine learning.

15. A non-transitory, computer-readable medium comprises a set of instructions stored therein which, when executed by a processor, causes the processor to detect malware associated with process threads by:
  capturing context information for each thread of a plurality of threads executing on the processor, each device of a plurality of devices executing a distributed application, wherein the context information identifies a stored thread pattern of a plurality of stored thread patterns for the distributed application, each stored thread pattern comprising information defining one or more known patterns for thread execution based on previous execution of one or more threads;
  comparing the stored thread pattern for each thread executing on the processor to the stored thread pattern identified by the captured context information for each thread executing on the processor;
  detecting a system level thread pattern variation based on the comparing of the stored thread pattern for each thread of the plurality of threads to the stored thread patterns, wherein the system level thread pattern variation is detected when the stored thread pattern for one or more threads of the plurality of threads does not match the stored thread patterns identified by the captured context information for each thread executing on the processor;
  detecting a network level thread pattern variation for threads of the distributed application replicated and executing on a plurality of devices;
  determining whether the detected system level thread pattern variation or the detected network level thread pattern variation indicates presence of malware; and
  performing one or more actions based on determining the detected system level thread pattern variation or the detected network level thread pattern variation indicates the presence of malware, wherein performing one or more actions based on determining the detected system level thread pattern variation or the detected network level thread pattern variation indicates the presence of malware comprises one or more of:
    quarantining a thread having a detected thread pattern variation,
    blocking a thread having a detected thread pattern variation from accessing resources,
    flagging a thread having a detected thread pattern variation, or providing thread pattern variation identification information.

16. The non-transitory, computer-readable medium of claim 15, wherein the context information comprises one or more of:
   thread execution time;
   time between successive executions of two or more threads;
   time between successive executions of the same thread;
   file access by the thread;
   Input/Output (I/O) access by the thread;
   keyboard tracking by the thread;
   network traffic related to the thread;
   ports used by the thread;
   destination addresses used by the thread;
   system Application Program Interface (API) usage by the thread;
   copy of data to other devices performed by the thread;
   stack information of the thread upon instantiation of the thread;
   stack variables of the thread; or
   stack information of the thread upon exit of the thread.

17. The non-transitory, computer-readable medium of claim 15, wherein comparing the stored thread pattern for at least one thread executing on the processor to the stored thread pattern identified by the captured context information for the at least one thread comprises comparing a thread pattern from a current execution of the thread to a previous execution of the same thread and wherein:
   the detected system level thread pattern variation or the detected network level thread pattern variation comprises one or more of:
      a change in a size of a stack for the thread,
      a change in data in the stack for the thread,
      a change in a size of a heap for the thread,
      a change in data in the heap for the thread, or
      a change in a size of code for the thread; and
   wherein determining whether the detected system level thread pattern variation indicates presence of malware further comprises one or more of:
      comparing system API usage for a thread having a detected thread pattern variation to previous system API usage for the thread,
      comparing file access for a thread having a detected thread pattern variation to previous to previous file access for the thread,
      comparing I/O access for a thread having a detected thread pattern variation to previous I/O access for the thread,
      comparing network traffic for a thread having a detected thread pattern variation to previous network traffic for the thread,
      comparing network addresses used by a thread having a detected thread pattern variation to previous network addresses used by the thread,
      comparing API usage for a thread having a detected thread pattern variation to previous API usage for the thread,
      comparing the context information for threads previously running in series but which are now running in parallel,
      comparing a file history for a thread having a detected thread pattern variation to a previous file history for the thread,
      dynamically comparing thread to thread context information for each of the plurality of threads,
      comparing system level thread patterns of a same application, or
      determining an importance of a thread having a detected thread pattern variation based on one or more user defined weights for the thread.

18. The non-transitory, computer-readable medium of claim 15, wherein the detected system level thread pattern variation or the detected network level thread pattern variation comprises one or more of:
   a new thread pattern;
   a new type of API call;
   a type of API call associated with malware;
   a new sequence of API calls;
   a change in an order of two or more threads;
   a missing thread;
   two or more threads previously executing in series now executing in parallel;
   two or more threads previously executing in parallel now executing in series;
   a change in an amount of time for a thread to execute;
   a change in an amount of time between executions of a thread;
   a change in thread priority for a thread;
   a thread that does not occur within a defined time period;
   a missing thread that is spun from an existing thread;
   a new thread that is spun from an existing thread;
   a missing thread that was previously identified as needed;
   a thread that does not occur at a predefined period;
   a thread that does not occur in response to an event associated with the thread; or
   a number of thread occurrences that exceeds a predefined threshold.

19. The non-transitory, computer-readable medium of claim 15, wherein detecting the network level thread pattern variation comprises at least one of:
   in response to detecting a thread pattern variation on a first device of the plurality of devices, sending information identifying the thread pattern variation from the first device to a second device of the plurality of devices and determining by the second device if a same thread pattern variation is detected in the distributed application on the second device;
   comparing the stored thread pattern for each thread to stored thread patterns for the distributed application executing across the plurality of devices; or
   comparing the stored thread pattern for a new thread on a first device of the plurality of devices to stored thread patterns for the same thread of the distributed application previously executed on a second device of the plurality of devices.

20. The non-transitory, computer-readable medium of claim 15, wherein the set of instructions further cause the processor to update the plurality of stored thread patterns using machine learning and based on execution of the plurality of threads, wherein the machine learning comprises one or more of unsupervised machine learning or supervised machine learning.

* * * * *